United States Patent [19]

Nagashima et al.

[11] Patent Number: 5,013,788
[45] Date of Patent: May 7, 1991

[54] LIQUID COATING COMPOSITION AND COATING METHOD FOR FORMING HARD-COAT FILM ON PLASTICS

[75] Inventors: Toshikazu Nagashima; Haruki Kuramashi; Yoshihiro Nishida, all of Matsusaka; Masahiro Hirukawa, Ise, all of Japan

[73] Assignee: Central Glass Company, Limited, Ube, Japan

[21] Appl. No.: 450,811

[22] Filed: Dec. 14, 1989

[30] Foreign Application Priority Data

Dec. 28, 1988 [JP] Japan .................................. 63-329120

[51] Int. Cl.$^5$ ................................................ C08K 5/05
[52] U.S. Cl. ..................................... 524/767; 524/789; 524/493; 524/492; 528/12; 528/26; 528/40; 106/287.13; 106/287.14; 106/287.16
[58] Field of Search .............................. 528/12, 26, 40; 524/492, 493, 789, 767; 106/287.13, 287.14, 287.16

[56] References Cited

U.S. PATENT DOCUMENTS 4,277,525  7/1981  Nakayama et al. ................ 528/26
4,294,950 10/1981  Kato ..................................... 528/12
4,476,281 10/1984  Vaughn, Jr. .................. 106/287.14

FOREIGN PATENT DOCUMENTS 63-30934  7/1988  Japan .

Primary Examiner—Paul R. Michl
Assistant Examiner—Karen A. Hellender
Attorney, Agent, or Firm—Fleit, Jacobson, Cohn, Price, Holman & Stern

[57] ABSTRACT

The invention provides a liquid coating composition for forming a transparent and hard coating film on a plastic member such as a polycarbonate or polymethyl methacrylate plate. The liquid composition comprises 100 parts by weight of an organotrialkoxysilane $R^1Si(OR^2)_3$, where $R^1$ is a $C_1$- or $C_2$-alkyl group and $R^2$ is a $C_1$-, $C_2$- or $C_3$-alkyl group, 5–20 parts by weight of an organotrialkoxysilane $R^3Si(OR^2)_3$, where $R^3$ is an organic group containing epoxy group, 50–200 parts by weight of an aqueous colloidal silica sol in which the content of $SiO_2$ is 10–40 wt %, and 0.5–3 parts by weight of a dicarboxylic acid $(CF_2)_n(COOH)_2$, where n is an integer from 1 to 5, preferably hexafluoroglutaric acid. On a surface of a plastic member a coating film of this composition is partially cured at 70°–150° C. to turn into a fairly hard but still pliable film. Then the plastic member can be shaped so as to bend the coated surface without suffering from cracking or peeling of the partially cured film. After that the film is treated with an aqueous alkali solution and then further cured at 80°–150° C.

6 Claims, No Drawings

LIQUID COATING COMPOSITION AND COATING METHOD FOR FORMING HARD-COAT FILM ON PLASTICS

BACKGROUND OF THE INVENTION

This invention relates to a liquid coating composition for forming a hard and abrasion resistant coating film on a plastic member and a method of forming such a coating film on a plastic member which is to be shaped after the application of the liquid coating composition thereto. The liquid coating composition is of the type using an organotrialkoxysilane and colloidal silica.

It is prevailing to use a synthetic resin high in transparency, such as polymethyl methacrylate or polycarbonate as a so-called organic glass. For plastic articles using a plate of such a resin it is almost indispensable to protect the plate surface with a coating film which is transparent, hard and resistant to abrasion and scratching. For example, it is well known to form a satisfactorily hard and transparent coating film by using a liquid coating composition containing an alkoxysilane and colloidal silica as the principal components.

When a plastic plate is to be shaped and provided with a hard coating film, the coating is made before and after shaping the plate. In the case of first forming the coating film on a flat plate the coating operation is easy, but in this case it is necessary to afford some flexibility and pliability to the coating film so that the coating film may not be damaged by shaping the plastic plate under heating, and therefore the surface hardness of the coating film is inevitably sacrificed. In the case of forming the coating film after shaping the plastic plate it is possible to form a sufficiently hard coating film, but in this case it is often that strict restrictions are placed on the coating method by reason of intricately curved shapes of the surfaces to be coated, and it is very difficult to form a coating film uniform in thickness and smoothness.

To bend a plastic plate having a hard coating film, there is a proposal of forming a linear notch in a coated surface of the plate to a depth greater than the coating film thickness, bending the plate along the notch such that the notched surface becomes the outside surface of the bent plate and thereafter machining the notched region of the outside surface to eliminate the notch by reducing the thickness of the plate in that region. However, this method entails complicated operations, and by this method the notched and subsequently machined region becomes relatively low in transparency, and it is impossible to form a gently curved surface.

JP No. 63-30934 proposes to accomplish shaping and hard coating of a polycarbonate plate by first applying a liquid coating composition comprising methyl-etherified methylolmelamine, glycol, hydrolytic partial condensate of an alkoxysilane and a curing agent to the flat plate, partially curing the coating film by heating at 120°-150° C. and then bending the plate at 150°-180° C. to fully cure the coating film during the bending operation. However, the surface hardness of the obtained coating film is insufficient since a melamine resin is used as a principal component of the coating material.

SUMMARY OF THE INVENTION

It is an object of the present invention to provide a liquid coating composition which provides a hard and transparent coating film on a plastic member, the coating film having adequate flexibility and pliability in a partially cured state so that the coated plastic member can be shaped without damaging the partially cured coating film and being further curable to become sufficiently high in surface hardness and resistance to abrasion and scratching.

It is another object of the invention to provide a method of forming a hard coating film on a plastic member by using a liquid coating composition according to the invention, which method allows the plastic member to be shaped at an elevated temperature after the application of the liquid coating composition thereto.

The present invention provides a liquid coating composition which comprises (a) 100 parts by weight of an organotrialkoxysilane represented by the general formula (1), (b) 5-20 parts by weight of an organotrialkoxysilane represented by the general formula (2), (c) 50-200 parts by weight of an aqueous sol of colloidal silica in which the content of $SiO_2$ is 10 to 40 wt %, and (d) 0.5-3 parts by weight of a dicarboxylic acid represented by the general formula (3):

$$R^1Si(OR^2)_3 \tag{1}$$

wherein $R^1$ is an alkyl group having not more than 2 carbon atoms, and $R^2$ is an alkyl group having not more than 3 carbon atoms, $$R^3Si(OR^2)_3 \tag{2}$$

wherein $R^3$ is an organic group containing an epoxy group, and $R^2$ is an alkyl group having not more than 3 carbon atoms, $$(CF_2)_n(COOH)_2 \tag{3}$$

wherein n is an integer from 1 to 5.

Furthermore, the invention provides a method of forming a hard and transparent coating film on a plastic member, the method comprising the steps of applying a liquid coating composition according to the invention to a surface of the plastic member to form a liquid coating film, drying the coating film, partially curing the dried coating film at a temperature in the range from about 70° C. to about 150° C., treating the partially cured coating film with an aqueous alkali solution, and thereafter further curing the coating film at a temperature not lower than 80° C.

When the plastic member is to be shaped with application of heat, the shaping can be performed in the course of the above coating method after the step of partially curing the coating film and before the step of treating the coating film with the alkali solution.

The primary feature of a liquid coating composition according to the invention is containing a dicarboxylic acid having perfluoroalkylene group. In the composition the acid serves as both curing catalyst and cross-linking agent. This dicarboxylic acid is very strong in acidity compared with a corresponding unsubstituted dicarboxylic acid since exclusively fluorine atoms are attached to every carbon atom of the alkylene group(s). The use of the fluorine substitued dicarboxylic acid is very effective for maintaining pH of the liquid coating composition at a low level and, hence, limiting the molecular weight of the prepolymer formed by partial condensation of hydrolyzed organotrialkoxysilanes in the composition. Furthermore, the dicarboxylic acid is a soft material by comparison with inorganic acids and, when it functions as a cross-linking agent, makes a contribution toward forming a polymer having pliability.

In the coating method according to the invention the partially cured coating film is a fairly hard film, but still the film has flexibility and pliability. Accordingly, when the coated plastic member is bent at a suitably elevated temperature the partially cured coating film bends in conformance with the bending of the plastic member without cracking or peeling off. After that the partially cured coating film can be further hardened by the above stated alkali treatment and subsequent heat treatment. The finally obtained coating film is a transparent film sufficiently high in surface hardness and resistant to abrasion and scratching.

A liquid coating composition according to the invention is applicable to various synthetic resins insofar as the heat resistance of the resin is sufficient for heat curing of the coating film. Since the ultimate hardness of the coating film becomes higher as the curing temperature is higher, the advantages of the invention are fully gained when it is applied to synthetic resin members such as plates which are relatively high in heat resistance. Synthetic resins important as organic glasses such as polycarbonate, polymethyl methacrylate and some other methacrylic or acrylic resins have heat resistance higher than 80° C. and accordingly can be coated by using the present invention.

DESCRIPTION OF THE PREFERRED EMBODIMENTS

In the present invention two kinds of organotrialkoxysilanes, (a) $R^1Si(OR^2)_3$ and (b) $R^3Si(OR^2)_3$ as defined above, are jointly used as the principal materials.

In the trialkoxysilane (a), neither the alkyl group $R^1$ bonding directly to Si atom nor the alkyl group $R^2$ in the alkoxyl group is very bulky. Accordingly, when this compound undergoes hydrolysis and partial condensation in the liquid coating composition a resultant siloxane polymer has a relatively tight polymer structure. Preferred examples of the trialkoxysilane (a) are methyltriethoxysilane, ethyltriethoxysilane and isopropyltrimethoxysilane. It is possible to jointly use two or more kinds of trialkoxysilanes represented by the general formula (1).

The trialkoxysilane (b) having an epoxy group in the organic substituent $R^3$ serves the function of a long-distance cross-linking agent, and the inclusion of this compound in the liquid coating composition is effective for forming a coating film having adequate pliability. The proportion of the trialkoxysilane (b) to the trialkoxysilane (a) is limited within the range from 5:100 to 20:100 by weight. If the amount of (b) is less than 5 parts, coating films formed by application of the liquid coating composition are liable to crack. It is unfavorable to use more than 20 parts of (b) for strong adhesion of the coating films to the substrate surface. Preferred examples of the trialkoxysilane (b) are 2-(3,4-epoxycyclohexyl)ethyltrimethoxysilane and γ-glycidoxypropyltrimethoxysilane. If desired it is possible to jointly use two or more kinds of trialkoxysilanes represented by the general formula (2).

Colloidal silica in the form of aqueous sol is on the market as an industrial material, and the commercial products include acidic sol, weakly basic sol and basic sol. However, for this invention an acidic or basic colloidal silica sol containing an inorganic acid or base as a colloid stabilizer is unsuitable because by mixing with an organotrialkoxysilane the sol becomes unstable and tends to become cloudy or milky by partial gelation. This invention uses a weakly basic colloidal silica sol having pH of 8-9 which is enhanced in stability, for example, by introducing aluminum ion. The concentration of $SiO_2$ in the aqueous colloidal silica sol is adjusted in order to adjust the quantity of water in the liquid coating composition according to the total quantity of the organotrialkoxysilanes. If the quantity of water is too small or too large the hydrolyzing reactions of the trialkoxysilanes do not proceed smoothly and uniformly. In general it is suitable to use an aqueous colloidal silica sol in which the content of $SiO_2$ is 10 to 40 wt %.

Colloidal silica is incorporated in the liquid coating composition mainly for the purpose of enhancing the hardness of coating films formed by application of the liquid composition. The amount of the aqueous colloidal silica sol is limited within the range from 50 to 200 parts by weight per 100 parts by weight of the organotrialkoxysilane (a). If the amount of the colloidal silica sol is less than 50 parts by weight the coating films are not always sufficient in hardness. On the other hand, when more than 200 parts of colloidal silica sol is added difficulties arise in forming coating films by application of the liquid composition.

Good examples of fluorine substituted dicarboxylic acids represented by the general formula (3) are difluoromalonic acid, tetrafluorosuccinic acid, hexafluoroglutaric acid and octafluoroadipic acid. It is preferred to use hexafluoroglutaric acid.

In the liquid composition according to the invention the amount of the dicarboxylic acid is from 0.5 to 3 parts by weight per 100 parts by weight of the organotrialkoxysilane (a). By using such an amount of the dicarboxylic acid the pH of the liquid composition is maintained at about 3 to about 4. If the amount of the dicarboxylic acid is less than 0.5 part by weight the pH of the liquid composition becomes above 4, and coating films formed by application of the liquid composition are insufficient in pliability. If the amount of the acid is more than 3 parts the pH of the liquid composition becomes too low so that the stability of colloidal silica in the composition is marred, and hence the liquid composition becomes cloudy or milky.

In preparing a liquid coating composition according to the invention the first step is preparing a mixture of the organotrialkoxysilanes (a) and (b). Next, a selected dicarboxylic acid of the general formula (3) is added to and mixed with the trialkoxysilane mixture, and then an aqueous colloidal silica sol is added. The resultant mixture is continuously stirred for several hours to about 24 hours at a moderately elevated temperature such as 30°-50° C. to cause hydrolytic partial condensation of the trialkoxysilanes. The stirring and heating for the reaction are terminated as the number average molecular weight of the partial condensate reaches about 1000. The molecular weight is calculated from the pattern of molecular weight distribution found by gel permeation chromatography (GPC) by using a calibration curve prepared with standard polystyrene.

A liquid composition obtained by the above treatment serves as a liquid coating composition for forming films on substrate surfaces, and the coating films have fairly good properties. However, from a practical point of view this composition is not always fully satisfactory in its collective characteristics as a liquid coating, because the evaporation balance of the liquid phase of the composition is marred by the formation of some lower alcohols as by-products of the above described reaction and also because some unwanted soluble salts and esters are present in the liquid composition. Therefore, it is preferable to add an aliphatic lower alcohol having a boiling point lower than 100° C. such as, for example, isopropyl alcohol or n-propyl alcohol to the liquid composition for the purpose of adjusting the evaporation balance of the liquid phase. Usually the addition of 30–100 parts by weight of such an alcohol per 100 parts by weight of the trialkoxysilane (a) used in preparing the composition suffices for the purpose.

Also it is preferable to subject the liquid composition added to an aliphatic lower alcohol to ultrafiltration to remove unwanted solutes and somewhat increase the concentration of solid phase in the composition. In the preparation of conventional liquid coating compositions using an organotrialkoxysilane and colloidal silica, it is usual to adjust the concentration of the solid phase by evaporation concentration with a rotary evaporator after adding an alcohol having a higher boiling point than water such as isobutanol or n-butanol. Such evaporation concentration of the liquid coating composition results in that the unwanted solutes are also concentrated, and hence the coating films formed by application of the concentration adjusted liquid composition are not always satisfactory in some important characteristics such as transparency, surface smoothness and/or hardness. By ultrafiltration concentration it is possible to remove the unwanted solutes. Besides, in the concentration adjusted liquid composition the distribution of molecular weight of the partial condensate becomes very narrow because of the molecular weight delimiting function of the ultrafiltration membrane, and therefore the liquid composition provides coating films excellent in hardness and other properties. It is suitable to use an ultrafiltration membrane which is 1000 or below in nominal delimitative molecular weight with respect to protein. Such a membrane is available on the market: suitable examples are UH-1 and UH-5 of Toyo Roshi Co. and Pellicon PSAC of Nippon Millipore Ltd. It is desirable that the pore diameter of the ultrafiltration membrane is 0.45 μm or smaller. The ultrafiltration concentration is made so as to adjust the content of solid phase in the liquid composition to 10–40 wt %. The liquid coating composition obtained by such ultrafiltration treatment is excellent in storage stability.

For further improvement in applicability of the liquid coating composition and/or weather resistance of the coating films, a conventional flow improving agent and/or a conventional benzophenone base UV absorber can be added to the liquid composition without any adverse influence.

A liquid coating composition according to the invention is applicable to various plastic materials including so-called organic glasses such as polymethylmethacrylate and polycarbonate to form a hard and transparent coating film. In the case of a plastic material not good in adhesion of the coating material thereto, such as polycarbonate, it is suitable to apply a commercially available acrylic resin base primer to the plastic material before applying the liquid coating composition.

The liquid coating composition can easily be applied to an object of coating by a conventional coating method such as dip coating, flow coating, spray coating or spin coating. In general the coating operation is performed so as to form a coating film having a thickness of 1 to 20 μm, and preferably 3 to 10 μm. The liquid coating film is left to air drying for evaporation of the liquid phase with care not to induce dew condensation on the coating film or clouding of the film. Then the coating film is partially cured by heating at 70°–150° C., and preferably at 80°–130° C., for about 30 minutes to a few hours. By this heat treatment condensation polymerization of the organotrialkoxysilanes proceeds in the coating film. As the result, the coating film hardens to such an extent that the film is not easily damaged by handling of the coated plastic member or by heat shaping of same. However, the coating film still possesses adequate flexibility or pliability because in this coating film the cross-linking density is lower than in conventional hard-coat films of siloxane polymer type and also because the coating composition contains a dicarboxylic acid having a perfluoroalkylene group which is high in acidity and serves the purpose of lowering the pH of the composition. Therefore, when the coated plastic member is subjected to heat shaping the partially cured coating film bends smoothly in conformance with bending of the plastic substrate without cracking or peeling off the substrate surface. For example, in the case of heat shaping of a polycarbonate plate the plate is kept heated at 150°–160° C. for several minutes, but such heating does not significantly affect the properties of the partially cured coating film on the plate, and the coating film offers no inconvenience to the shaping of the heated plate.

However, the partially cured coating film lacks long-term stability. Therefore, the partially cured coating film is subjected to the following treatments. When the coated plastic member is to be shaped under heating, the following treatments are made after the shaping operation.

The partially cured coating film is wetted with an aqueous alkali solution by applying the solution to the coating film or immersing the coated member in the solution. The wetted coating film is left standing for several minutes, and then the surface of the coating film is washed with water and dried. After that the coating film is further cured by heating for a few hours at a temperature not lower than 80° C. and usually not higher than 150° C. The solute of the alkali solution can be selected from various water-soluble bases. In practice it is convenient to use an alkali metal salt, alkaline earth metal salt or ammonia. For shortening the length of time required for drying the surface of the coating film treated with the alkali solution, it is favorable to add a water-soluble organic solvent having a relatively low boiling point such as an alcohol to the aqueous alkali solution. The alkali concentration in the solution does not need to be very high. That is, it is unnecessary to use an alkali solution stronger than 0.5N solution.

EXAMPLE 1

First, 100 parts by weight of methyltriehoxysilane (MTES) was mixed with 10 parts by weight of 2-(3,4-epoxycyclohexyl)ethyltrimethoxysilane (ECETMS), and 1 part by weight of hexafluoroglutaric acid (HFGA) was dissolved in the silane mixture. To the resultant mixture, 100 parts by weight of a weakly basic aqueous sol of colloidal silica (SNOWTEX C supplied from Nissan Chemicals Co.) was added. In the aqueous sol the content of $SiO_2$ was 20 wt %, and mean particale size of colloidal silica was 15 μm. The resultant mixture was heated at 30° C. for about 24 hr with continuous stirring to cause hydrolysis and partial condensation of the trialkoxysilanes. The product of this process was a liquid composition containing about 29 wt % of solid phase. In the liquid composition the partial condensate of the trialkoxysilanes had a number average molecular weight of about 1100 by measurement by GPC.

Then about 70 parts by weight of isopropyl alcohol was added to the above liquid composition, and the resultant liquid composition was concentrated by ultrafiltration using an ultrafiltration membrane (Pellicon PSAC of Nippon Millipore Ltd.), which was 1000 in nominal delimitative molecular weight, to thereby obtain a liquid coating composition containing 28 wt % of solid phase. The pH of the liquid composition was 4, and the partial condensate of the trialkoxysilanes in the composition had a number average molecular weight of about 1200 by measurement by GPC.

After adding about 5 parts by weight of diethylene glycol monoethyl ether, the liquid coating composition was applied by a dip coating method to test pieces of polycarbonate plate having a thickness of 3 mm. The test pieces were treated with an acrylic resin base primer and dried inadvance. After natural drying the coating film on every test piece was partially cured by heating at 120° C. for about 30 min. After this heat treatment some test pieces were subjected to the bending test and the surface hardness test described below.

Bending Test

Each test piece was adequately softened by heating at 160° C. for about 1.5 hr and soon manually bent on a pipe nearly half around the circumference to examine whether the coating film cracks or not. Several pipes different in diameter were used to find a minimum radius of curvature with which the test piece can be bent without cracking the coating film.

Surface Hardness Test

An abrasion resistance test was made by a method generally in accordance with ASTM D 1044 using Taber's tester. The abrading test was carried out 500 cycles by using two abrading wheels of CS-10F type and a load of 500 g on each wheel. The surface hardness of the coating film was represented by the amount of a change in Haze value ($\Delta$Haze, %) produced by the abrasion test.

The results of these tests are shown in the following table.

The remaining test pieces having the partially cured coating film were immersed in an alkali solution for about 5 min, soon washed with distilled water and then heated at 120° C. for about 1 hr to further cure the coating film into a very hard film. The alkali solution was prepared by mixing 1 part by volume of 0.05N aqueous solution of NaOH with 1 part by volume of isopropyl alcohol.

The test pieces having the hard-cured coating film were subjected to the surface hardness test described above and a weather resistance test, which was made with a sunshine weathermeter according to JIS D 0205 to measure the length of time elapsed before percepting a change in appearance of the coating film by visual observation. The results are shown in the table together with the data of the following examples and comparative examples. As can be seen in the table the final curing after the alkali solution treatment resulted in a remarkable enhancement of the surface hardness of the coating film: in terms of $\Delta$Haze, from 25% to only 3%.

EXAMPLE 2-6

In each of these examples the process of Example 1 for the preparation of a liquid coating composition was repeated except for the change(s) shown in the table. In Example 2, the amount of ECETMS was increased. In Example 3, $\gamma$-glycidoxypropyltrimethoxysilane (GPTMS) was used in place of ECETMS, and the amount of the aqueous colloidal silica sol was increased to 150 parts by weight. In Example 4 the quantity of the acid, HFGA, was decreased, and in Example 5 the quantity of HFGA was increased. In Example 6, ethyltriethoxysilane (ETES) was used in place of MTES.

In every example the obtained liquid coating composition was coated on the polycarbonate plate (3 mm thick) by the same method as in Example 1, and the coating film was partially cured by heating at 120° C. for about 30 min, then treated with the alkali solution used in Example 1 and further cured by heating at 120° C. for about 1 hr. The test pieces with the partially cured film and with the finally cured film were subjected to the tests described above.

COMPARATIVE EXAMPLES 1-6

In each of these comparative example the process of Example 1 for the preparation of a liquid coating composition was modified only in the point(s) shown in the table. In Comparative Example 1 the quantity of the acid, HFGA, was very small, and in Comparative Example 2 the quantity of the same acid was very large. In Comparative Examples 3 to 6, organic acids not containing fluorine were selectively used in place of HFGA. In Comparative Examples 4 and 6, GPTMS was used in place of ECETMS.

The liquid coating composition of each Comparative Example was coated on the polycarbonate plate by the same method as in Example 1, and the coating film was partially cured by heating at 120° C. for about 30 min, then treated with the alkali solution used in Example 1 and further cured by heating at 120° C. for about 1 hr. The test pieces with the partially cured film and with the finally cured film were subjected to the tests described above.

| | Liquid Coating | | | | Partly Cured Coating Film | | Coating Film Cured after Treatment with Alkali Solution | |
|---|---|---|---|---|---|---|---|---|
| | Alkoxysilanes (part by wt.) | Acid (part by wt.) | pH | Average M.W. of partial condensate | Solid Phase (wt %) | Surface Hardness ($\Delta$Haze, %) | Bending (radius of curvature, mm) | Surface Hardness ($\Delta$Haze, %) | Weather Resistance (hr) |
| Ex. 1 | MTES/ECETMS (100)/(10) | HFGA (1) | 4.0 | 1200 | 28 | 25 | 8 | 3 | >1000 |
| Ex. 2 | MTES/ECETMS (100/20) | " | 4.1 | 1100 | 29 | 27 | 10 | 4 | >1000 |
| Ex. 3 (*1) | MTES/GPTMS (100/10) | " | 3.6 | 1200 | 29 | 28 | 20 | 2 | 1000 |

-continued

| | Liquid Coating | | | | | Partly Cured Coating Film | | Coating Film Cured after Treatment with Alkali Solution | |
|---|---|---|---|---|---|---|---|---|---|
| | Alkoxysilanes (part by wt.) | Acid (part by wt.) | pH | Average M.W. of partial condensate | Solid Phase (wt %) | Surface Hardness (ΔHaze, %) | Bending (radius of curvature, mm) | Surface Hardness (ΔHaze, %) | Weather Resistance (hr) |
| Ex. 4 | MTES/ECETMS (100/10) | HFGA (0.7) | 4.2 | 1200 | 28 | 25 | 8 | 3 | >1000 |
| Ex. 5 | MTES/ECETMS (100/10) | HFGA (3) | 3.6 | 1200 | 28 | 28 | 8 | 3 | >1000 |
| Ex. 6 | ETES/ECETMS (100/10) | HFGA (1) | 4.0 | 1200 | 28 | 28 | 10 | 4 | >1000 |
| Comp. Ex. 1 | MTES/ECETMS (100/10) | HFGA (0.3) | 4.5 | 1200 | 28 | 15 | 50 | 6 | >1000 |
| Comp. Ex. 2 | MTES/ECETMS (100/10) | HFGA (5) | 3.2 | 1200 | 28 | — (*2) | — | — | — |
| Comp. Ex. 3 | MTES/ECETMS (100/10) | phosphoric acid (1) | 4.0 | 1100 | 28 | 29 (*3) | 50 | 12 | >1000 |
| Comp. Ex. 4 | MTES/GPTMS (100/10) | glutaric acid (1) | 5.6 | 1200 | 28 | 10 | >100 | 5 | >1000 |
| Comp. Ex. 5 | MTES/ECETMS (100/10) | oxalic acid (1) | 3.3 | 1200 | 28 | 30 (*3) | 50 | 14 | >1000 |
| Comp. Ex. 6 | MTES/GPTMS (100/10) | acetic acid (1) | 5.9 | 1200 | 28 | 9 | >100 | 8 | >1000 |

(*1) The amount of colloidal silica was increased.
(*2) The coating film exhibited whitish clouding.
(*3) The coating film exhibited slight, whitish clouding.

What is claimed is:

1. A liquid coating composition, comprising:
   (A) 100 parts by weight of a first organotrialkoxysilane represented by the formula $R^1Si(OR^2)_3$, wherein $R^1$ is an alkyl group having not more than 2 carbon atoms, and $R^2$ is an alkyl group having not more than 3 carbon atoms;
   (B) 5-20 parts by weight of a second organotrialkoxysilane represented by the formula $R^3Si(OR^2)_3$, wherein $R^3$ is an organic group containing epoxy group, and $R^2$ is an alkyl group having not more than 3 carbon atoms;
   (C) 50-200 parts by weight of an aqueous sol of colloidal silica in which the content of $SiO_2$ is 10 to 40 wt %; and
   (D) 0.5-3 parts by weight of a dicarboxylic acid represented by the formula $(CF_2)_n(COOH)_2$, wherein n is an integer from 1 to 5.

2. A composition according to claim 1, wherein said first organotrialkoxysilane is selected from the group consisting of methyltriethoxysilane and ethyltriethoxysilane.

3. A composition according to claim 1, wherein said second organotrialkoxysilane is selected from the group consisting of 2-(3,4-epoxycyclohexyl)ethyltrimethoxysilane and γ-glycidoxypropyltrimethoxysilane.

4. A composition according to claim 1, wherein said dicarboxylic acid is selected from the group consisting of difluoromalonic acid, tetrafluorosuccinic acid, hexafluoroglutaric acid and octafluoroadipic acid.

5. A composition according to claim 1, further comprising 30-100 parts by weight of an aliphatic alcohol having a boiling point lower than 100° C.

6. A composition according to claim 1, wherein pH of the liquid composition is in the range from about 3 to about 4.

* * * * *